United States Patent [19]

Kaneko et al.

[11] Patent Number: 4,777,482
[45] Date of Patent: Oct. 11, 1988

[54] FINGER-TOUCH COORDINATE INPUT APPARATUS INCLUDING A SUPPLY OF AIR FOR DUST REMOVAL

[75] Inventors: Kenichi Kaneko; Koji Hikosaka, both of Yokohama; Hiroichi Katsuta, Tokyo, all of Japan

[73] Assignee: Honeywell Inc., Minneapolis, Minn.

[21] Appl. No.: 929,032

[22] Filed: Nov. 10, 1986

[30] Foreign Application Priority Data

Nov. 15, 1985 [JP] Japan .................. 60-174957

[51] Int. Cl.⁴ ............................................ G09G 1/00
[52] U.S. Cl. ................................. 340/706; 340/700; 340/712; 250/221; 250/549; 178/18
[58] Field of Search .............. 340/712, 706, 815.2, 340/700; 178/18-20; 250/221, 222.1, 549

[56] References Cited

U.S. PATENT DOCUMENTS

| | | | |
|---|---|---|---|
| 4,313,109 | 1/1982 | Funk et al. | 340/712 |
| 4,459,476 | 7/1984 | Weissmueller et al. | 340/712 |
| 4,517,559 | 5/1985 | Deitch et al. | 340/712 |
| 4,621,257 | 11/1986 | Brown | 340/706 |

FOREIGN PATENT DOCUMENTS 0110330 8/1980 Japan .................. 340/712

Primary Examiner—John W. Caldwell, Sr.
Assistant Examiner—Tyrone Queen
Attorney, Agent, or Firm—A. A. Sapelli; D. J. Lenkszus; A. Medved

[57] ABSTRACT

A finger-touch coordinate input apparatus according to the present invention comprises printed circuit boards provided between a display screen and its front frame and having light-emitting and light-receiving element groups thereon, and LED filters provided outside the printed circuit boards at a predetermined distance therefrom, constituting side edges of the display screen, and having light-transmitting portions at part thereof, wherein spaces formed between the printed circuit boards and the LED filters are connected to an air supply source so that an air flow is generated in at least one space, thereby easily and properly eliminating degradation of the detection function due to dust or the like at photodetectors in which the light-emitting and light-receiving elements for coordinate position detection are arranged.

5 Claims, 2 Drawing Sheets

FINGER-TOUCH COORDINATE INPUT APPARATUS INCLUDING A SUPPLY OF AIR FOR DUST REMOVAL

BACKGROUND OF THE INVENTION

The present invention relates to a finger-touch coordinate input apparatus of a touch screen system, which allows direct information input to an information processing apparatus from a coordinate position on a display screen by pointing out a desired position on a display of a cathode ray tube (CRT) display device (or some other like device).

As a coordinate input apparatus of a touch screen system of this type, the following two systems are generally well known in the art. A first system includes a touch pad which is adhered to a display screen, such as a tube surface of a CRT display device, and a capacitance change (i.e., a parameter change) caused by pressing a predetermined point of the pad with a finger tip is detected, thereby determining a coordinate position. In a second system, a plurality of opposite light-emitting and light-receiving element pairs are arranged along upper, lower, right, and left side edges of a tube surface (display screen) of a CRT display device to obtain a matrix-like optical path, whereby light-receiving states along the X- and Y-axes are scanned, thereby determining a coordinate position pointed out by a finger tip from a shielded, or interrupted, light path. In the later optical system using the above-mentioned light-emitting and light-receiving elements, unlike the former system, a display screen is not pressed directly by a finger or other pointed object, so that the screen is not contaminated by dirt and the image on the screen remains clear, resulting in greater practical advantages.

In the conventional optical finger-touch coordinate input apparatus described above, dust enters, falls, and is deposited on the parts of the light-emitting elements (or light-receiving elements) constituting photodetectors arranged along and inside the side edges of the display screen, or dust (or the like) tends to be adhered to the back surfaces of the LED filters, thereby degrading a light-emitting or light-receiving function. This problem is significant because the printed circuit boards and the LED filters constituting the photodetectors described above are disposed on a curved surface of the display screen of the CRT display device so that the space in this portion cannot be eliminated. In addition, dust tends to adhere to the surface of the above-mentioned display screen because of a high voltage of the CRT display device.

To eliminate such an operational failure, periodical cleaning is required. However, since the above-mentioned light-emitting and light-receiving elements are disposed inside the housing, the cleaning is troublesome, complex, and hence is not practical. Therefore, an easy and proper countermeasure is needed to eliminate the functional failure due to disposition of dust or the like, with a simple arrangement.

In order to eliminate the above problem, a finger-touch coordinate input apparatus according to the present invention comprises printed circuit boards provided between a display screen and its front frame and having light-emitting and light-receiving element groups thereon, and LED filters provided outside the printed circuit boards at a predetermined distance therefrom, constituting side edges of the display screen, and having light-transmitting portions in parts thereof, wherein spaces formed between the printed circuit boards and the LED filters are connected to an air supply source so that an air flow is generated in at least one of the spaces, thereby effectively eliminating the deposition or adhesion of dust to the light emitting and light receiving elements.

SUMMARY OF THE INVENTION

Therefore, the present invention provides a finger-touch coordinate input apparatus for inputting information by shielding, with a finger or a like object, a matrix-like optical path defined on a display screen by opposite light-emitting and light-receiving element groups arranged along side edges of said display screen. The apparatus comprises substantially planar printed circuit boards placed between the display screen and a front frame and having the light-emitting and light-receiving element groups housed thereon. Substantially planar LED filters are provided, spaced apart from the printed circuit boards by a predetermined distance therefrom, thereby forming the side edges of the display screen, the LED filters having light-transmitting portions. The space formed between the printed circuit boards and the LED filters the display screen and the front frame form a substantially enclosed space, or passageway having an input port and an output port, the input port being adapted to receive a supply of air so that an air flow is generated in at least one of spaces.

Accordingly, it is an object of the present invention to provide an apparatus for effectively eliminating adhesion or deposition of dust and other contaminants.

It is another object of the present invention to provide an apparatus for effectively eliminating adhesion or deposition of dust and other contaminates to photodetectors.

It is still another object of the present invention to provide an apparatus for effectively eliminating adhesion or deposition of dust and other contaminants to photodetectors of touch screen systems.

These and other objects of the present invention will become more apparent when taken in conjunction with the following description and attached drawings, wherein like characters indicate like parts, and which drawings from a part of the present application.

DETAILED DESCRIPTION

Figure 1:
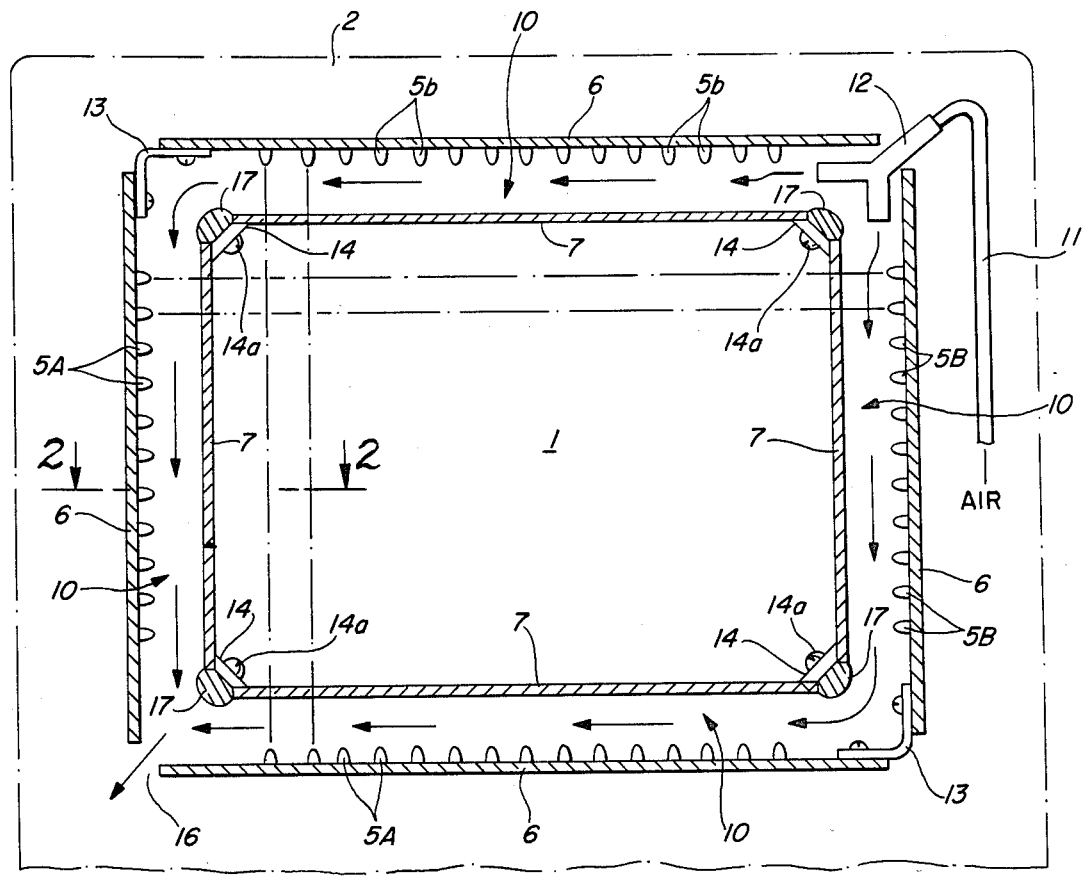
FIG. 1 is a front view showing an essential part of an embodiment of a finger-touch coordinate input apparatus according to the present invention.
Figure 4:
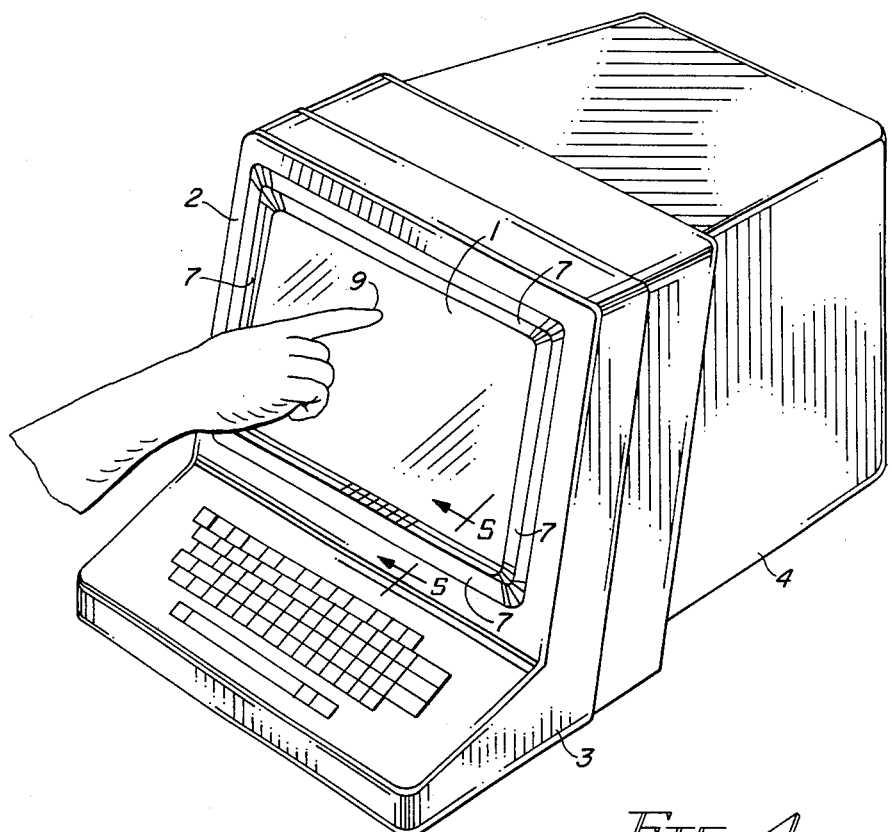
FIG. 4 is a perspective view showing an outer appearance of a CRT display device.
Figure 5:
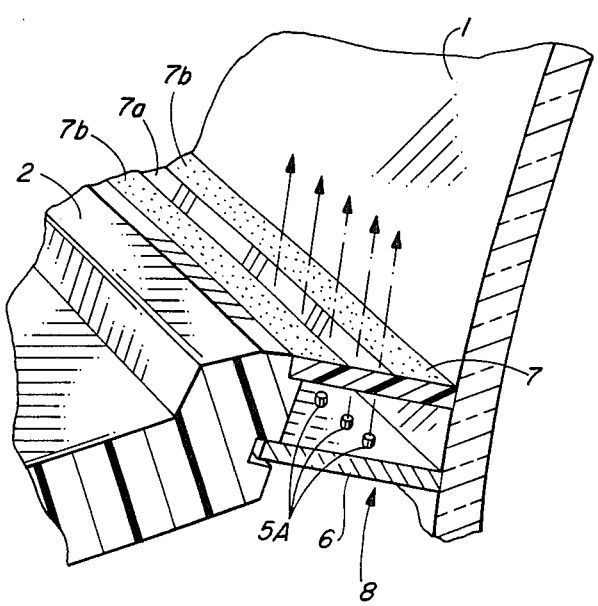
FIG. 5 is a perspective sectional view showing an essential part of an alternative apparatus.

Before proceeding with a detailed description of the present invention an overview of an optical finger-touch coordinate input apparatus will be briefly described with reference to FIGS. 4 and 5. In FIGS. 4 and 5, reference numeral 1 denotes a display screen such as a tube surface of a CRT display device; 2, its front frame; 3, a housing having the CRT display device therein; and 4, its rear cover. Photodetectors 8 are provided in front of the display screen 1, and between the display screen 1 and the front frame 2 surrounding its upper, lower, right, and left side edges as shown in FIGS. 5 and 1. The photodetectors 8 consist of substantially planar printed circuit boards 6 having light-emitting elements 5A or light-receiving elements 5B (not shown in FIG. 5) arranged at predetermined intervals, and substantially planar LED filters 7 disposed in front of the printed circuit boards 6 at a predetermined distance therefrom and constituting side edges of the display screen 1. The photodetectors 8 form a matrix-like optical path on the display screen 1. The above-mentioned LED filters 7 are formed of a transparent synthetic resin or the like having light-transmitting properties, and the LED filters have light-transmitting portions 7a which are formed in parts opposite to the light-emitting elements 5A (or the light-receiving elements 5B), and light-shielding portions 7b which are formed in the other parts by printing, painting, or the like in black.

In the above arrangement, by shielding a matrix-like optical path formed on the display screen 1 by the light-emitting element groups 5 (wherein reference numeral 5 includes 5A and 5B) with a finger tip 9 or a like object, the coordinate point thus indicated is detected as input information.

According to the present invention, since an air flow is generated, or caused to flow, within the within the space in which light-emitting 5A or light-receiving (not shown) elements are arranged, dust or the like entering the space is properly and completely blown off, thereby effectively eliminating adhesion or deposition of dust on the light-emitting 5A or light-receiving (not shown) elements, and will be discussed in further detail hereinunder.

Figure 2:
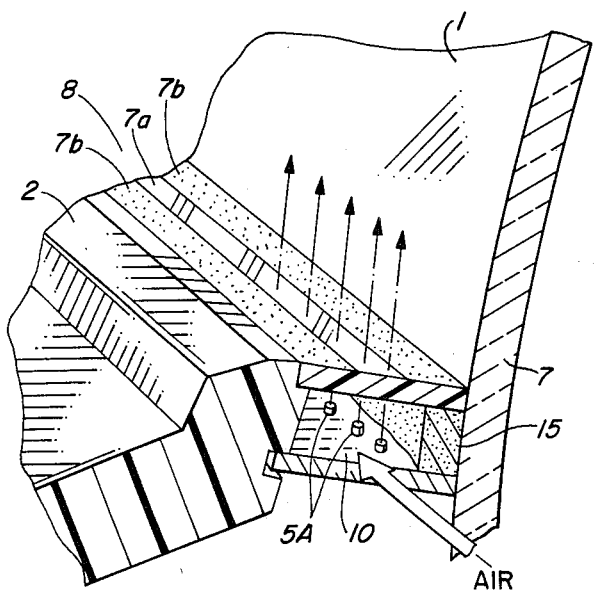
FIG. 2 is a perspective sectional view taken on line 2—2 of FIG. 1.

Referring to FIGS. 1 and 2, there is shown a front view of a finger-touch coordinate input apparatus for inputting information by shielding (or interrupting) a matrix-like optical path (part or the optical path being shown by an alternate long and short dashed line in FIG. 1) utilizing a finger or some other pointed-like object. The matrix-like optical path is defined on a display screen 1 by opposite light-emitting elements 5A and light-receiving element 5B groups arranged along side edges of the display screen 1, characterized by printed circuit boards 6 provided between the display screen 1 and a front frame 2 and having the light-emitting elements 5A and light-receiving elements 5B groups thereon. LED filters 7 are spaced apart from the printed circuit boards 6 by a predetermined interval and extend from display screen 1 to frame 2 defining space, or passage, 10 (as shown in FIG. 2). LED filters 7 constitute the side edges of the display screen 1, and have light-transmitting portions 7a. The spaces, or passages, 10 formed between the printed circuit boards 6, the LED filters 7, display screen 1 and frame 2 are connected to an air supply source (not shown) through an air hose 11 and a branch tube 12 so that an air flow is generated in at least one of spaces, or passages, 10 which will be described further hereinunder.

Still referring to FIGS. 1 and 2, the preferred embodiment of the present invention includes four printed circuit boards 6 arranged along upper, lower, right, and left side edges of the display screen 1 to surround and provide the display screen 1 with light-emitting elements 5A and light-receiving elements 5B. Four (4) LED filters 7 face the display screen 1 inside the printed circuit boards 6, and are connected by connectors 13 and 14 (or the like) so as to form rectangles, respectively. The front side of the resultant structure is closed by part of the front frame 2, and the back side thereof is closed by partition plates 15 disposed to partition the display screen 1, and serving as an air filter. With this arrangement, spaces, or passages, 10 formed around the perimeter of the display screen 1 communicate with each other. The branch tube 12 is disposed at the upper right corner of the space 10 to blow and supply an air flow in two directions, and an exhaust port 16 for the air flow is formed at the lower left corner.

The above-mentioned air supply source can be derived from an air pressure pipe for driving various pneumatic instruments (such as a cable or an air duct), which may be readily available in a control room in which a finger-touch coordinate input apparatus of the present invention is installed. However, various modifications, such as providing a special pump, can be made.

With such an arrangement, since an air flow is generated by introducing air pressure in the spaces 10 in which the light-emitting 5A or light-receiving elements 5B are arranged, dust (or like contamination) entering into the spaces 10 is properly and completely blown off, thereby effectively eliminating adhesion, deposition, (or the like) of the dust to the light-emitting 5A or light-receiving elements 5B. In addition, a temperature rise in the spaces 10 can be advantageously prevented. In this case, if the above-mentioned spaces are sealed to some extent, it is possible to forcibly generate an air flow to obtain a desired effect even when the above-mentioned supplied air pressure is low. On the other hand, if the supplied air pressure is high, functional degradation due to dust or the like can be effectively prevented even when there is a gap in the spaces 10 described above. Therefore, it will be readily understood that the above-mentioned partition plates 15 may be omitted in some cases (shown in FIG. 5).

Note that in the apparatus described above, only a few of the light-emitting 5A and light-receiving elements 5B are illustrated. However, as a matter of course, a large number of the element groups 5 can be arranged to cover the display screen 1 in a matrix manner so that at least two longitudinal and transverse optical paths are shielded by the finger tip 9 (partially shown). When the display density of the screen is increased, high coordinate position detecting accuracy is strictly required. When display density is low, the element 5 density need not be high, thus, such an arrangement, in which the coordinate position (x,y) can be detected by an optical path shielded by the finger tip 9 or the like, is sufficient.

There has been described above the case wherein the spaces 10, of the photodetectors 8 provided inside four side edges surrounding the display screen 1, are formed to communicate with each other, thereby generating an air flow throughout the spaces 10. Alternatively, the air flow may be generated at one of the spaces 10, especially at the space 10 formed along the lower side edge of the display screen 1. More specifically, since the above-mentioned problem caused by the dust or the like is significant at the space 10 having therein the light-emitting 5A or light-receiving 5B element groups arranged along the lower side edge of the display screen 1 of the CRT display apparatus, it is sufficient to perform the dustproof countermeasure properly and completely at this portion.

Figure 3:
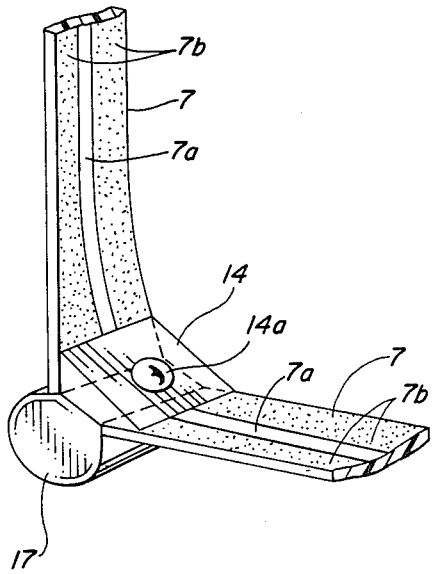
FIG. 3 is a perspective view showing an essential part of connection portions of LED filters.

The above-mentioned LED filters 7 are conventionally fixed to the front frame 2 of the apparatus by an adhesive. Referring to FIG. 3, there is shown the connection of LED filters 7 in the preferred embodiment. The connectors 14, for holding the connecting portions of the LED filters 7, are fixed to fixing boss portions 17 extending from the front frame 2 by screws 14a, thereby easily performing attaching and detaching of the LED filters 7.

It will be understood by those skilled in the art that the present invention is not limited to the structure of the embodiment described herein, but shapes, structures, or the like of each portion can be readily modified or changed as dictated by the design of the touch screen system. For example, a description has been made with reference to the case wherein the light-emitting 5A and light-receiving 5B elements are arranged along the upper, lower, right and left side edges of the display screen in the above embodiment. However, the present invention is not limited to this configuration, but can be modified such that the light-emitting 5A and light-receiving 5B elements are mixed in each array. It will also be understood by those skilled in the art that the present invention can be applied not only to the CRT display device but also to a liquid crystal display, a fluorescent display tube, or any display device which is connected to various information processing systems and is used as an output device.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. A finger-touch coordinate input apparatus for inputting information by shielding with a finger or a like object a matrix-like optical path defined on a display screen by opposite light-emitting and light-receiving element groups arranged along side edges of said display screen, comprising:
   (a) mounting means provided between said display screen and a front frame for mounting said light-emitting and light-receiving element groups thereon; and
   (b) light transmitting means spaced apart from the mounting means by a predetermined interval, for forming the side edges of said display screen, said mounting means, light transmitting means, display screen and front frame forming a passage, means forming an input port and means forming an output port into and out of the passage, said means forming an input port adapted to receive a supply of air so that an air flow is established in the passage.

2. A finger-touch coordinate input apparatus, having a front frame and a display screen, the display screen having top, bottom, and first and second side edges, said edges forming a periphery of the display screen, for inputting information by shielding a portion of a matrix-like optical path with a finger or a like object, the matrix-like optical path being defined on the display screen by opposite light-emitting and light-receiving element groups arranged along said edges of said display screen, said apparatus comprising:
   (a) substantially planar board means, placed between said display screen and said front frame such that said substantially planar board means is essentially perpendicular to the display screen, said substantially planar board means further being placed around the periphery of said display screen a first predetermined distance from the periphery of the display screen, for housing said light-emitting and light-receiving element groups thereon; and
   (b) substantially planar LED filter means placed between said display screen and said front frame around the periphery of said display screen, said substantially planar LED filter means being a first predetermined distance from the substantially planar board means and such that a surface of said substantially planar LED filter means is essentially parallel to a surface of the substantially planar board means, for enclosing said light-emitting and light-receiving element groups in a space defined by said display screen, said front frame, said substantially planar board means, and said substantially planar LED filter means, said space having a first and second port, the first port adapted to receive a gas from a gas supply, and the second port being adapted to exhaust said gas from said space.

3. A finger-touch coordinate input apparatus for inputting information according to claim 2, further comprising:
   partition plate means, said partition plate means being placed inside said space in contact with the display screen, for providing a seal at corners formed by the display screen and the substantially planar board means, and between the display screen and the substantially planar LED filter means.

4. A finger-touch coordinate input apparatus, having a front frame and a display screen, the display screen having top, bottom, and first and second side edges, said edges forming a periphery of the display screen, for inputting information by shielding a portion of a matrix-like optical path with a finger or a like object, the matrix-like optical path defined on the display screen by opposite light-emitting and light-receiving element groups arranged along said edges of said display screen, said apparatus comprising:
   (a) a plurality of printed circuit board means, each printed circuit board means placed between said display screen and said front frame such that each of said printed circuit board means is essentially perpendicular to the display screen, each of said printed circuit board means further being placed along the periphery of said display screen a first predetermined distance from the periphery of the display screen, for housing said light-emitting and light-receiving element groups thereon; and
   (b) a plurality of LED filter means placed between said display screen and said front frame along the periphery of said display screen such that each of the plurality of said LED filter means being positioned a first predetermined distance from one of the plurality of printed circuit board means and such that a surface of each of said LED filter means is essentially parallel to a corresponding surface of one of the printed circuit board means, for enclosing said light-emitting and light-receiving element groups in a plurality of contiguous passages defined by said display screen, said front frame, each of said printed circuit board means, and each of said LED filter means, said passages being connected so that air under pressure inserted into a port of a predetermined passage flows through the connected passages to an exhaust port of another predetermined passage.

5. A finger-touch coordinate input apparatus for inputting information according to claim 4, further comprising:
a plurality of partition plate means, said partition plate means being placed inside predetermined ones of said passages in contact with the display screen, for providing a seal at intersections of the display screen and each of the printed circuit board means, and at intersections of the display screen and each of the LED filter means.

* * * * *